United States Patent
Onken et al.

(10) Patent No.: US 7,221,746 B1
(45) Date of Patent: May 22, 2007

(54) SENSING METHOD FOR MONITORING CONDITIONS FOR A REMOTE LOCATION

(75) Inventors: Donald Onken, Box-72, Virden, IL (US) 62633; John J. Richardson, Jacksonville, IL (US); Steve Stone, 202 Maltby Row, Virden, IL (US) 62690

(73) Assignees: Donald Onken, Easton, IL (US), Part Interest; J. J. Richardson, Jacksonville, FL (US), Part Interest; Steve Stone, Virden, IL (US), Part Interest ( * ) Notice: Subject to any disclaimer, the term of this patent is extended or adjusted under 35 U.S.C. 154(b) by 0 days.

(21) Appl. No.: 09/432,498

(22) Filed: Nov. 2, 1999

Related U.S. Application Data

(60) Provisional application No. 60/113,466, filed on Dec. 23, 1998.

(51) Int. Cl.
*H04M 11/00* (2006.01)

(52) U.S. Cl. ............... 379/106.01; 379/106.02; 379/37

(58) Field of Classification Search .......... 379/37, 379/38, 39, 40, 41, 42, 43, 44, 45, 46, 47, 379/48, 49, 50, 51, 106.01, 106.02
See application file for complete search history.

(56) References Cited

U.S. PATENT DOCUMENTS

| | | | | |
|---|---|---|---|---|
| 3,636,863 A | 1/1972 | Woyden | ................. | 100/49 |
| 4,402,095 A * | 9/1983 | Pepper | ................. | 4/623 |
| 4,640,988 A | 2/1987 | Robinton | ................. | 379/90 |
| 4,779,460 A | 10/1988 | Cruickshank | ................. | 73/313 |
| 4,788,648 A | 11/1988 | Ferretti et al. | ................. | 364/509 |
| 4,924,221 A | 5/1990 | Filippone | ................. | 340/870.38 |
| 4,953,109 A | 8/1990 | Burgis | ................. | 364/550 |
| 4,968,976 A | 11/1990 | Johnson | ................. | 340/624 |
| 4,993,058 A | 2/1991 | McMinn et al. | ................. | 379/37 |
| 5,012,507 A * | 4/1991 | Leighton et al. | ................. | 379/37 |
| 5,016,197 A | 5/1991 | Neumann et al. | ................. | 364/550 |
| 5,136,281 A | 8/1992 | Bonaquist | ................. | 340/644 |
| 5,154,079 A | 10/1992 | Lupoli | ................. | 73/308 |
| 5,173,866 A | 12/1992 | Neumann et al. | ................. | 364/550 |
| 5,214,594 A | 5/1993 | Tyler et al. | ................. | 364/550 |
| 5,299,493 A | 4/1994 | Durbin et al. | ................. | 100/50 |
| 5,303,642 A | 4/1994 | Durbin et al. | ................. | 100/50 |
| 5,444,760 A | 8/1995 | Russ | ................. | 379/45 |
| 5,490,210 A * | 2/1996 | Sasso | ................. | 379/93.05 |
| 5,530,258 A | 6/1996 | Crowne | ................. | 250/577 |

(Continued)

FOREIGN PATENT DOCUMENTS

| | | | |
|---|---|---|---|
| JP | 405288541 A | * | 11/1993 |
| JP | 409233462 A | * | 11/1997 |

*Primary Examiner*—Melur Ramakrishnaiah
(74) *Attorney, Agent, or Firm*—Ronald E. Greigg

(57) ABSTRACT

The present invention is for a sensing device that monitors the conditions of a remote location. The device has a detecting means which detects the conditions at the remote location; a transmitting module that reads and remotely transmits information containing the detected conditions and the power level of a power source powering the transmitting module; a base module that receives, selectively processes and conveys the information telephonically; and an identifying means that identifies the remote location of the call without incurring a telephone toll charge. The invention is also directed to a method of sensing conditions at a remote location without incurring telephone toll charges.

28 Claims, 14 Drawing Sheets

U.S. PATENT DOCUMENTS

| | | | |
|---|---|---|---|
| 5,558,013 A | 9/1996 | Blackstone, Jr. | 100/35 |
| 5,723,870 A | 3/1998 | Crowne et al. | 250/577 |
| 5,726,636 A * | 3/1998 | Hayes et al. | 379/40 |
| 5,745,849 A | 4/1998 | Britton | 455/404 |
| 5,748,706 A | 5/1998 | Morgan et al. | 379/37 |
| 5,784,441 A * | 7/1998 | Davis et al. | 379/106.01 |
| 5,787,429 A | 7/1998 | Nikolin, Jr. | 707/10 |
| 5,838,771 A | 11/1998 | Moeller | 379/37 |
| 5,850,519 A * | 12/1998 | Vazana | 379/88.17 |
| 5,960,061 A * | 9/1999 | Fashie et al. | 379/37 |
| 6,021,177 A * | 2/2000 | Allport | 379/48 |
| 6,144,735 A * | 11/2000 | Bella | 379/93.05 |

\* cited by examiner

SENSING METHOD FOR MONITORING CONDITIONS FOR A REMOTE LOCATION

PRIORITY

This is a nonprovisional application of provisional patent application Ser. No. 60/113,466, filed Dec. 23, 1998.

INCORPORATION BY REFERENCE

The MICROFICHE APPENDIX that is attached hereto for the software program submission is incorporated by reference herein. The MICROFICHE APPENDIX includes a page of microfiche containing 35 frames.

FIELD OF THE INVENTION

The present invention is directed to a sensing device for monitoring conditions at a remote location and a method therefor. Particularly, the instant invention is for a sensing device that monitors the conditions of a container at a remote location and a method therefor. More particularly, the disclosed invention is for a sensing device that monitors the level of waste materials in a waste disposal container at a remote location and, then, relays this information to allow for the emptying of the waste disposal container.

BACKGROUND OF THE INVENTION

The amount of trash is an ever-growing problem. This is especially true in the retail and commercial sectors, where a large amount of refuse is discarded daily. Most businesses have trash bins adjacent to their buildings for dumping the totality of trash collected either daily or throughout the day. The rate at which the garbage piles up in these trash receptacles varies according to factors such as the season, the industry, the location, etc. Consequently, different businesses and different locations of a business may require different pick-up times for their trash bins.

To minimize the cost of hiring commercial trash collection services to pick-up the trash from the trash receptacles, some companies may designate standard pick-up times, such as daily or weekly, even though the trash bins may not be full. Other companies may call commercial trash collection services only when their trash bins are full. Either way, the company usually must use the telephone to call the commercial trash collection service.

The detection of the level of trash in trash receptacles is known in the art. Such detection usually entails some device or method used within the receptacle that senses the level of trash. For instance, a photoelectric cell has been employed for this purpose, as described in U.S. Pat. No. 3,765,147 to Ippolito. Another variation measures the pressure exerted on the trash compactor to detect when the receptacle is full, as disclosed in U.S. Pat. No. 4,773,027 to Neumann. Still, U.S. Pat. No. 3,636,863 to Woyden teaches using pressure-sensing means to determine when the trash container is full.

Additionally, it is known in the art to utilize a means for relaying the information regarding the fullness of the trash receptacle to another location, where the information can be processed. Usually, this relaying method encompasses a telephone or cellular phone line. Some of these devices include U.S. Pat. No. 5,558,013 to Blackstone, Jr.; U.S. Pat. Nos. 5,299,493 and 5,303,642 to Durbin et al.; U.S. Pat. No. 5,214,594 to Tyler et al.; and U.S. Pat. Nos. 5,173,866 and 5,016,197 to Neumann et al.

While each of these systems are useful, they are burdened by several significant disadvantages:

First, they fail to minimize the expenses of telephone toll charges when transmitting information regarding the trash receptacles via a telephone line. This charge may be quite expensive, in light of the fact that some systems maintain a multitude of trash containers.

Second, they do not allow users to measure the amount of power supply left in the transmitting means. If the power supply runs out, the waste disposal detection system would be rendered useless.

Third, the references do not disclose a way to conserve energy and, thus, allow one to save on more expenses. And, since these references fail to conserve energy, they are not optimally environmentally friendly.

Fourth, the references do not disclose a means to verify that the measurements of the waste disposal container are valid, thereby preventing false readings which may also result in unnecessary charges in emptying a container that is not completely full.

BRIEF SUMMARY OF THE INVENTION

The instant invention is for a sensing device that may be used for detecting various conditions at remote locations. In particular, one embodiment of the invention is directed to a sensing device for detecting the conditions of a container at a remote location. Another embodiment would be used to detect conditions in a waste disposal container at a remote location.

Generally, this invention features three main components: a transmitting module, a receiving module and an identifying means. While each transmitting module is paired with one base module, each base module may be matched with a multitude of transmitting modules at any one remote location to accommodate the number of containers at that location. Moreover, there may be numerous remote locations comprising such pairings.

The invention also comprises a detecting means for detecting the conditions at the remote location. The detected information is sent to the transmitting module, which has a reading means and a transmitting means. The reading means reads the detected information. In practical usage, the transmitting module also has a first power source for supplying power thereto. The first power source has a power level that is also read by the reading means. The transmitting means sends the information pertaining to the conditions of the remote location and the power level of the first power source to the base module, which is located near the transmitting module. Advantageously, the transmitting module is only turned-on for approximately 10 seconds, during which time it completes all of its functions. This results in substantial savings in energy charges and is environmentally-friendly.

The base module comprises a receiving means, a first processing means and a conveying means. The receiving means receives the transmitted information from the transmitting module and, then, sends the information to the first processing means of the base module. In one embodiment of the present invention, information from containers located at a close proximity to the base module may be sent directly to the first processing means, without utilizing a transmitting module. Additionally, the base module may have a second power source whereby the power level of this power source is also sent to the first processing means. The first processing means selectively processes all of the information it receives to determine which of a list of pre-programmed telephone numbers to call. In other words, each telephone number matches-up with each of the conditions of the remote location, the amount of power supply in the first and second power sources, and the conditions of the containers located at a close proximity to the base module. The conveying means relays the transmitted information by calling the selected telephone number.

An identifying means is used to identify the remote location of the call. This is typically accomplished by identifying the originating telephone number of the remote location. In the most preferred embodiment, the identifying means identifies the data being transmitted in as little time as possible. This is accomplished through the use of a second microprocessor having a CALLER ID unit that can identify the location of the originating call without having to "answer" or "connect" the call. Once the originating telephone number of the remote location is identified, one embodiment of the invention would allow for the container or trash receptacle at the remote location to be emptied or for the power level of the first power source to be recharged.

Another embodiment of the present invention is a method of monitoring the conditions at a remote location. Two other embodiments of the invention include: (1) a method for remotely monitoring the conditions of a container; and (2) a method for remotely monitoring the conditions of a trash receptacle.

It is, therefore, an object of the present invention to teach a means for alleviating the problems associated with the prior art systems of trash receptacle detection.

It is an object of the instant invention to provide a sensing device for monitoring conditions at a remote location and a method therefor.

It is also an object of this invention to provide a sensing device for monitoring the conditions of a container at a remote location and a method therefor.

It is another object of the present invention to provide a sensing device for monitoring the conditions of a waste disposal container and a method therefor.

A further object of this invention is to provide a sensing device that transmits its data in as little time as possible, and a method therefor.

It is also an object of the instant invention to provide a sensing device that measures the power supply of the transmitting means and a method therefor.

Another object of the present invention is to provide a sensing device that conserves the consumption of energy used by the device and a method therefor.

It is a further object of this invention to provide a sensing device that is environmentally friendly and a method therefor.

It is an object of the present invention to provide a means to verify the information regarding the conditions of a container.

There has thus been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention. Those skilled in the art will appreciate that the conception, upon which this disclosure is based, may readily be utilized as a basis for the designing of other devices for carrying out the several purposes of the present invention. It is important, therefore, that the invention be regarded as including such equivalent constructions insofar as they do not depart from the spirit and scope of the present disclosure.

BRIEF DESCRIPTION OF THE SEVERAL VIEWS OF THE DRAWINGS

The foregoing and other additional objects of the present invention will be readily appreciated by those skilled in the art upon gaining an understanding of the invention as described in the following detailed description and shown in the accompanying drawings in which.

DETAILED DESCRIPTION OF THE INVENTION

Figure 1:
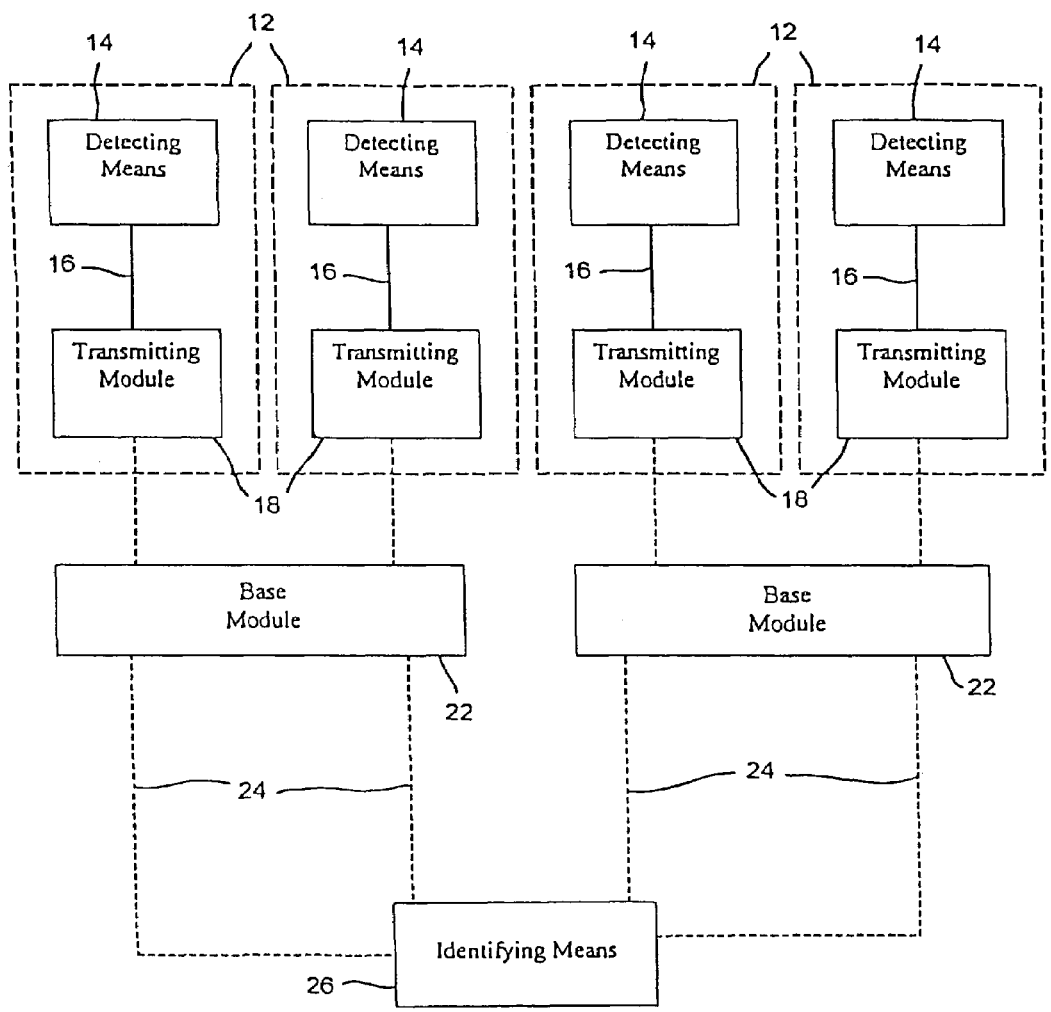
FIG. 1 is a block diagram illustrating the generalized embodiment of the sensing device of the present invention.

Referring to the drawings, FIG. 1 shows a block diagram of four sensing devices 10 of the instant invention. Each sensing device 10 comprises, generally, detecting means 14, a transmitting module 18, a base module 22 and identifying means 26. The detecting means 14 and the transmitting module 18 are located at a remote location 12 (shown as dotted rectangular areas in FIG. 1). The detecting means 14 detects conditions at the remote locations 12. Lines 16 show that the detected information is sent to a transmitting module 18. The transmitting module 18 reads the information before transmitting the information, shown by dotted-line 20, to a base module 22.

Figure 2:
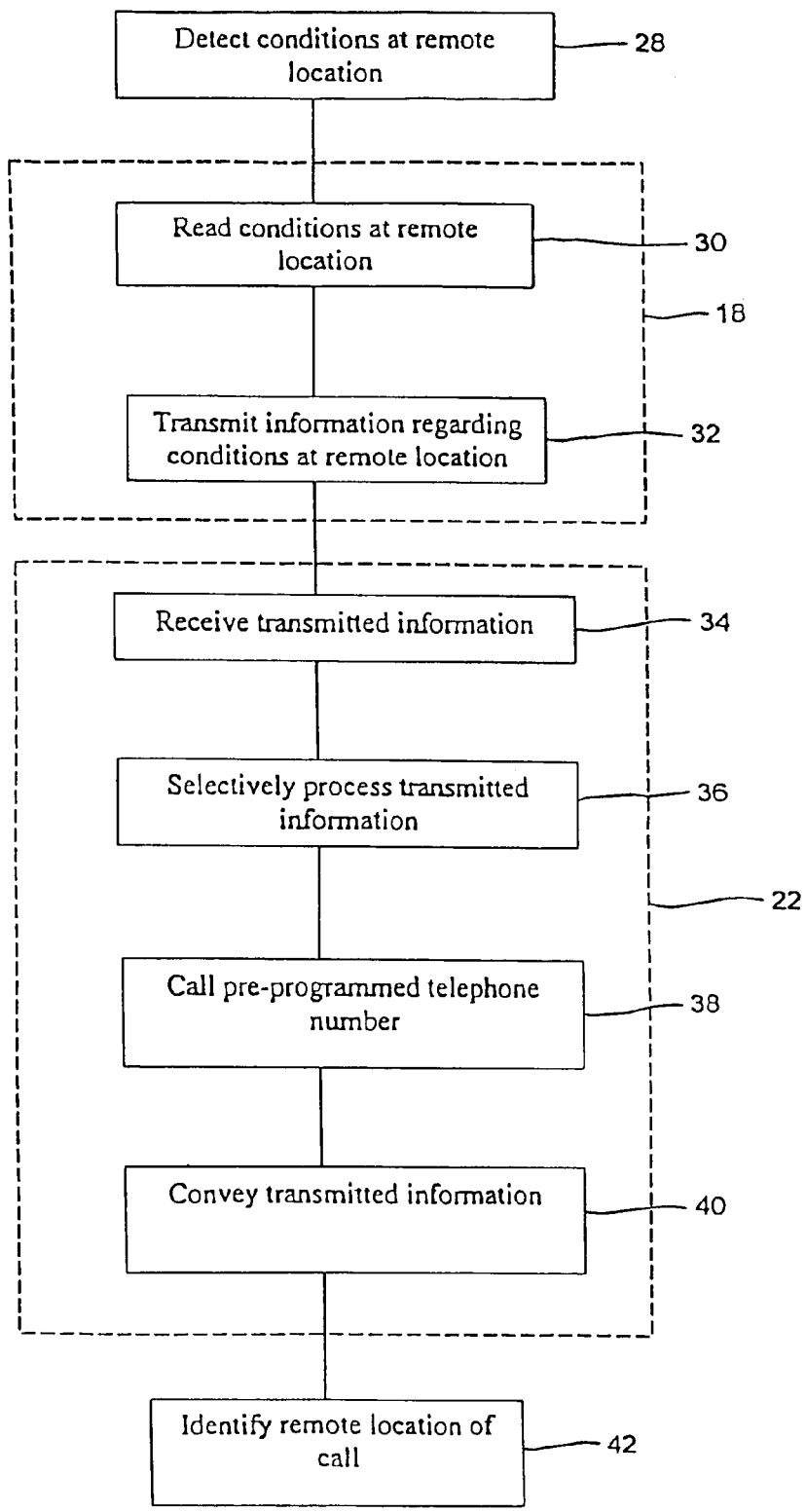
FIG. 2 is a flow diagram showing the steps of the general embodiment of the method of monitoring conditions at a remote location of the present invention.

When the base module 22 receives the transmitted information, it processes the information to determine which number from a database 136 of pre-programmed telephone numbers to call (shown as step 38 in FIG. 2). This call is shown by line 24, which also shows the information being conveyed to the identifying means 26. As FIG. 1 depicts the general embodiment of this invention, other embodiments will be apparent in the following descriptions of the relevant figures. For instance, since the identifying means 26 necessarily identifies the remote location 12 of the call by identifying a telephone number, it follows that each remote location 12 must have its own originating telephone number. Also, even though only one identifying means 26 is show in FIG. 1, it will be shown infra that there most likely comprises a multitude of identifying means 26 to match-up with the host of different conditions processed by the base module 22.

FIG. 2 is a flow diagram depicting the generalized method for monitoring conditions at a remote location 12. Step 28 detects the conditions at the remote location 12. Step 30 reads the detected conditions. Next, the information regarding the detected conditions are transmitted by step 32 and received by step 34. The information is processed by step 36 to determine which pre-programmed telephone number to call. Step 38 calls the selected pre-programmed telephone number, while step 40 conveys the transmitted information. The remote location 12 of the call is, then, identified by step 42. In this embodiment, steps 30 and 32 occur in the transmitting module 18; steps 34 to 40 occur in the base module 22; and step 42 occurs in the identifying means 26.

Figure 3:
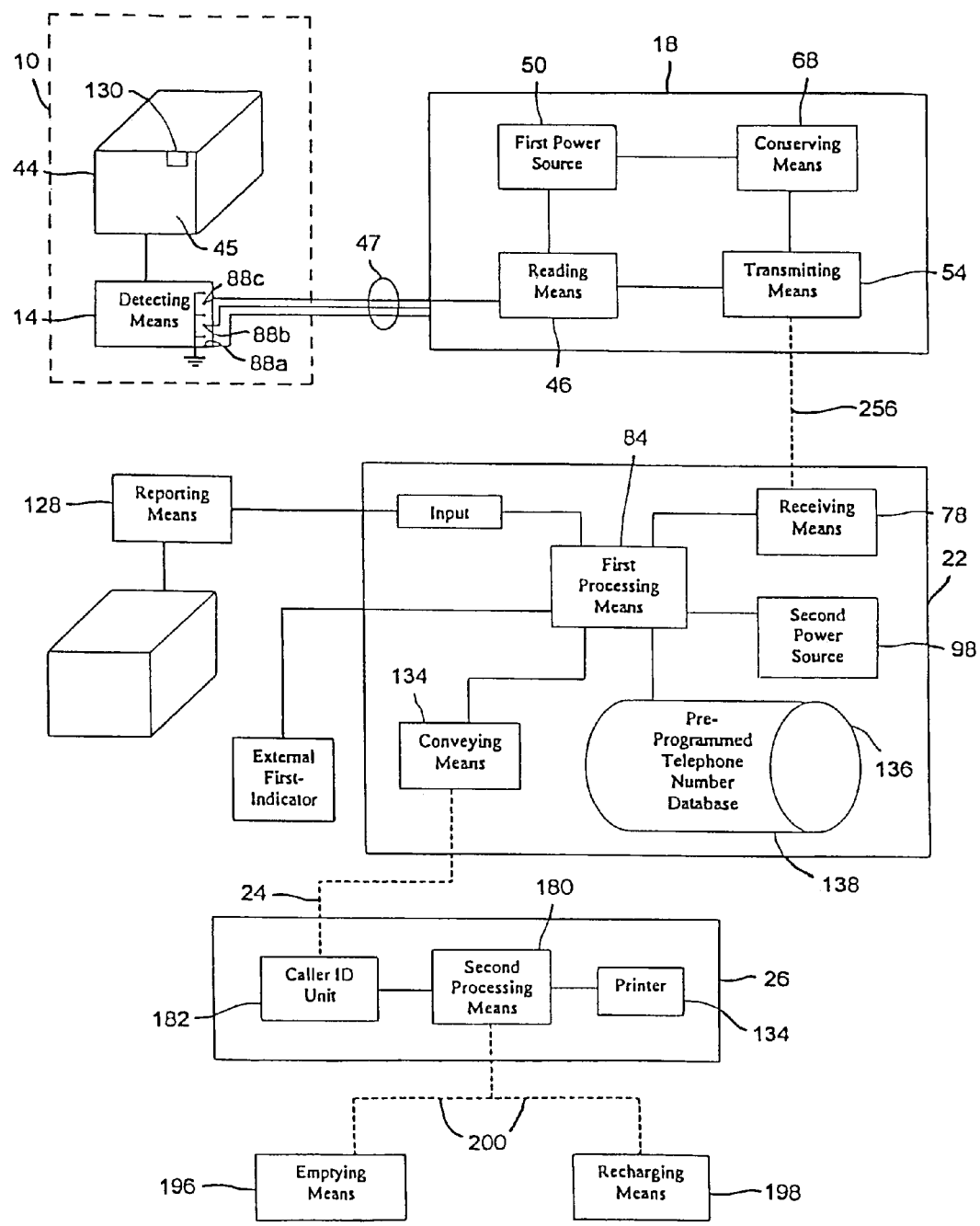
FIG. 3 is a schematic block diagram displaying another embodiment of the sensing device of the present invention in which the conditions of a container are monitored by the sensing device.
Figures 1, 3A:
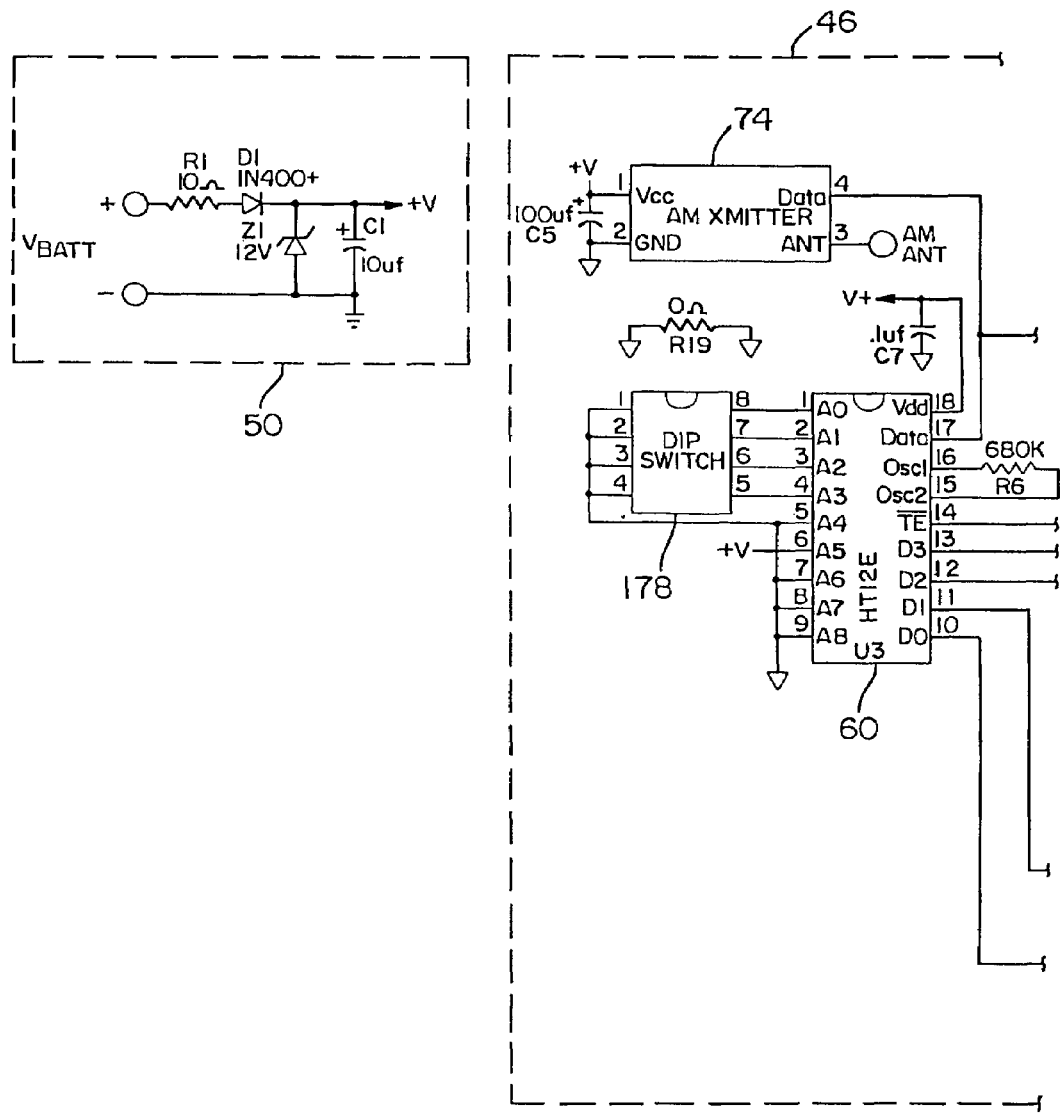
FIG. 3A (3A-1 and 3A-2) shows details of the transmitting module.
Figures 2, 3A:
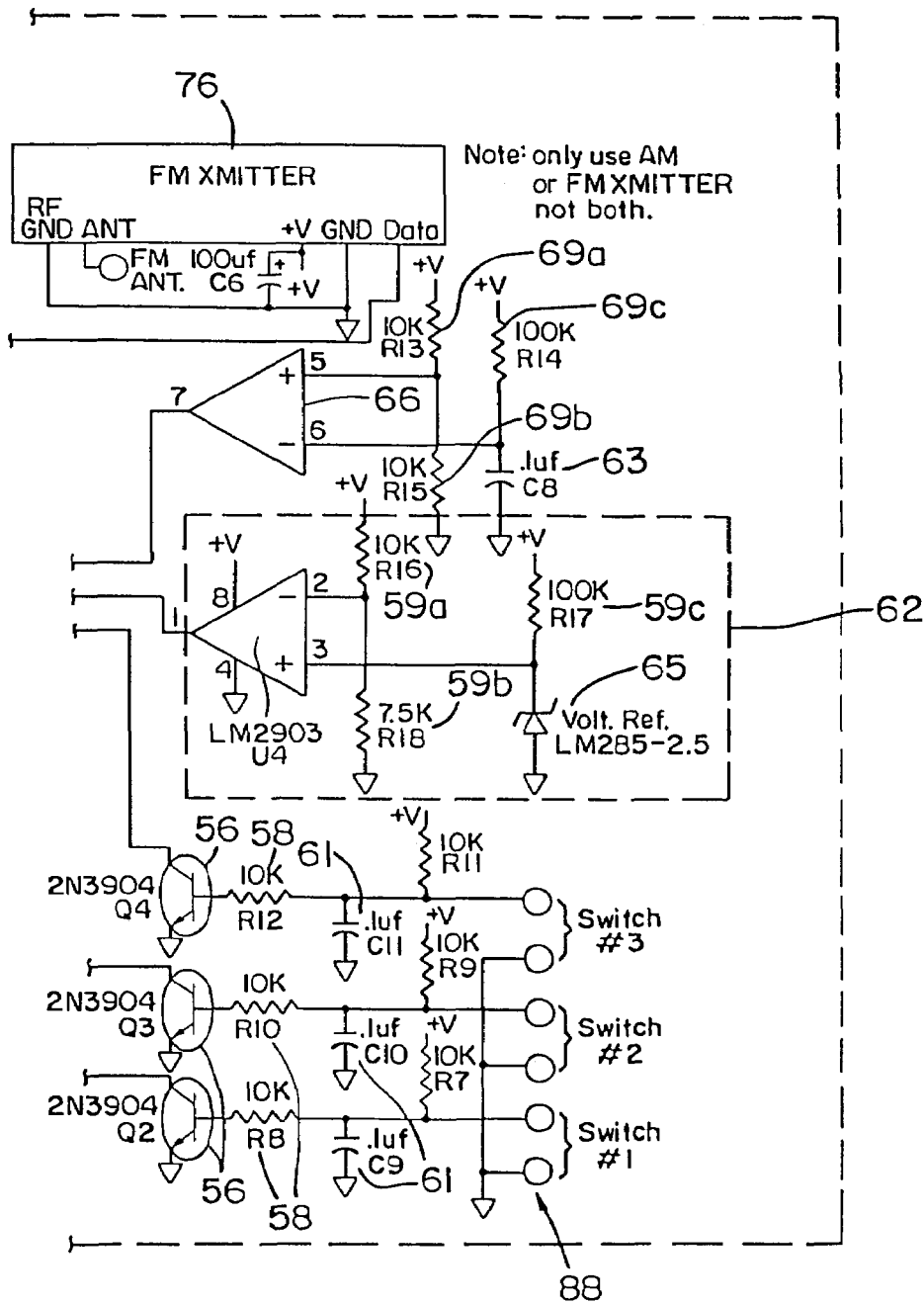
Figures 1, 3B:
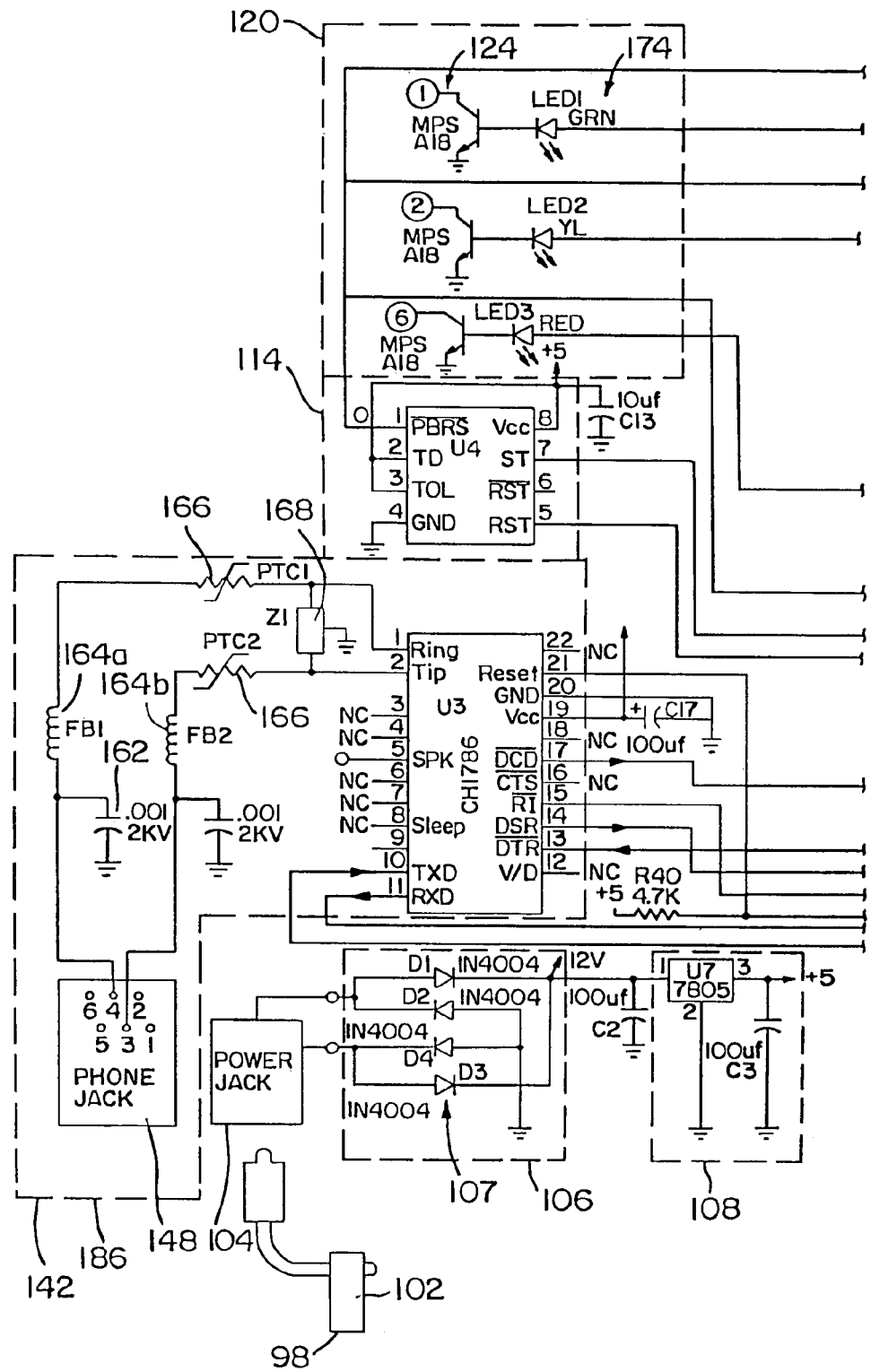
FIG. 3B (3B-1, 3B-2 and 3B-3) shows details of the base module.
Figures 2, 3B:
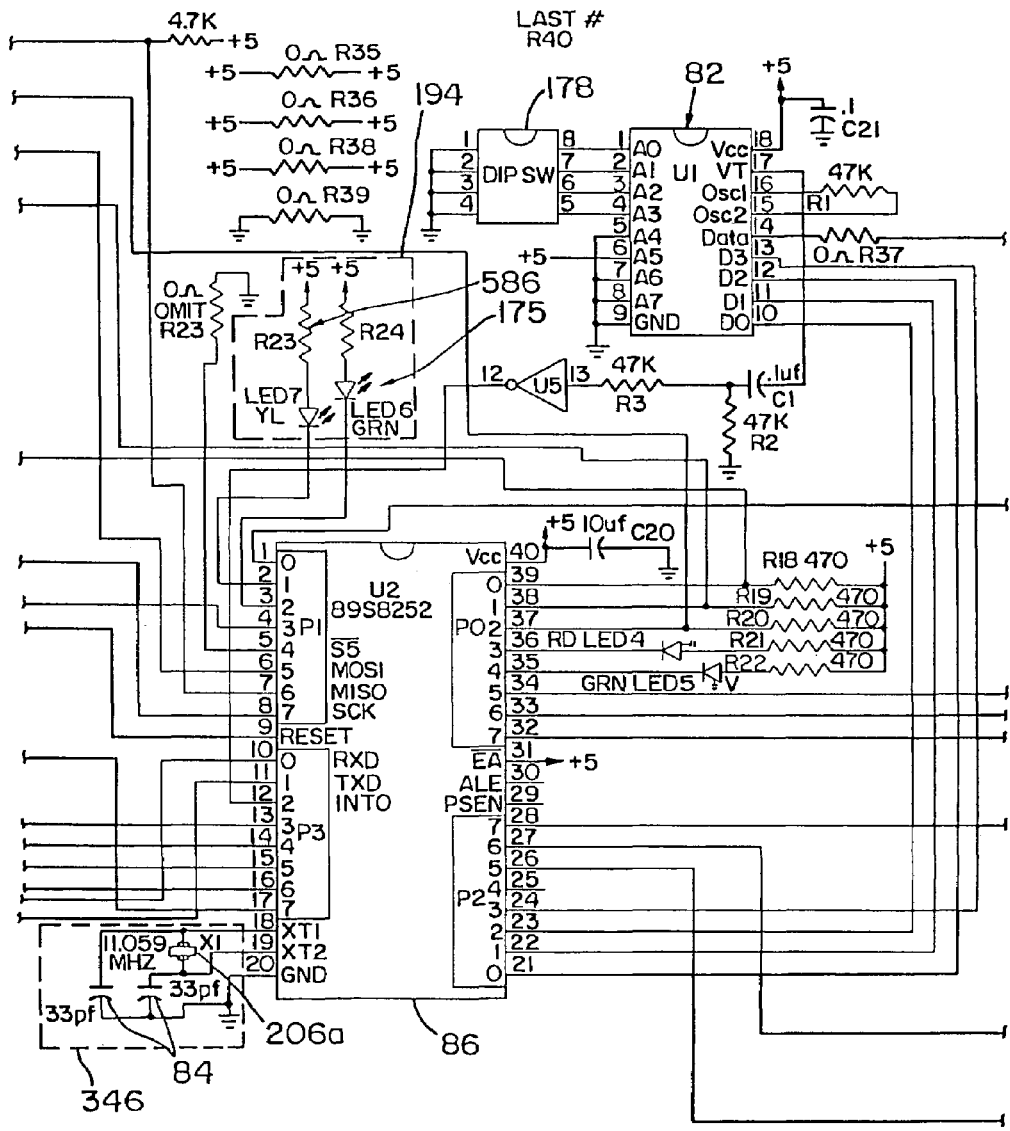
Figures 3, 3B:
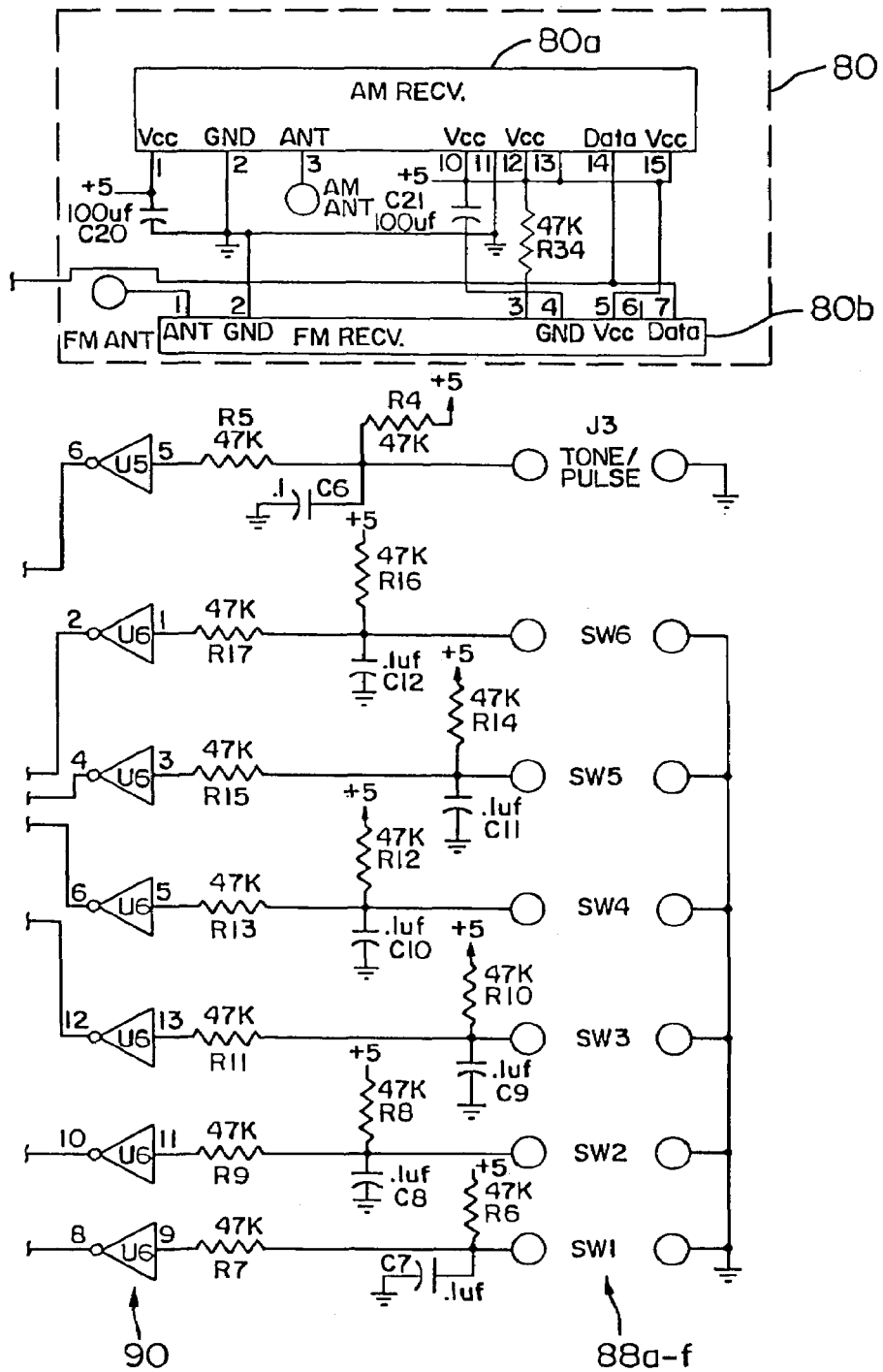

Another embodiment of this invention is shown in FIG. 3, in which a sensing device 10 monitors the conditions of a container 44 at a remote location 12. The container 44 may be any type of container that holds materials, such as liquids or solids. The conditions of the container 44 include whether the container 44 is full or empty, the level of the contents 45 in the container 44, or any other condition that the user needs to monitor. A detecting means 14 is used to analyze the conditions of the container 44. Detecting means 14 that are compatible with the instant invention include conventional detecting means 14 disclosed in U.S. Pat. Nos. 3,765,147, 4,773,027, and 3,636,863 (cited above). Preferred detecting means 14 include switch inputs 88 and ultrasonic ranging units 130. The most preferred ultrasonic ranging units 130 comprise units made by Polaroid.

But, the most preferred detecting means 14 are switch inputs 88. The switch inputs 88 of this embodiment are connected by wires 47, also called hard wire inputs, to the container 44. The contents 45 inside of the container 44 are typically oil and grease. A float is placed on top of the contents 45 whereby the float is connected to a first end of the wires 47. The second end of the wires 47 is connected to the switch inputs 88, which are themselves secured in the transmitting modules 18. In operation, the float will rise and fall depending on the level of the contents 45 in the container 44, and this information will be sent to the switch inputs 88. Each switch input 88 matches with a condition of the container 44. The preferred embodiment would utilize three switch inputs 88 to indicate whether the container 44 is ¾ full (input 3 88c), ½ full (input 2 88b) or ¼ full (input 1 88a). If the container 44 is empty, none of the switch inputs 88a–88c will be activated.

A further embodiment of the present invention illustrated in FIG. 3 is a first power source 50, such as a battery that provides power to the transmitting module 18. The first power source 50 has a power level that can be measured by a measuring means to determine when it is low and, thus, needs to be recharged or changed. A first power source 50 that may be used with this invention is a battery supply 50, most preferably a 9-volt battery.

The information regarding the conditions of the container 44 is sent by the detecting means 14 to the reading means 46 of the transmitting module 18. The reading means 46 reads both the information from the detecting means 14 and the power level 2 of the first power source 50, and transfers the information to the transmitting means 54. The preferred reading means 46 comprises a combination of at least one transistor 56, at least one resistor 58 and an encoder 60 per switch 88, when a preferred switch input 88 is used. The transistor 56 conveys high and low switch information to the encoder 60, and the resistor 58, along with a capacitor 61, limits the current to protect the transistor 56 from damage and noise/static. It is preferred that the transistor 56 comprises a 2N3904 transistor 56. The resistors 58 comprise 10 kilo-ohm resistors 58a, while the capacitor 61 comprises a 0.1 microferad-50 volt ceramic capacitors 61. In another embodiment of the instant invention, a measuring means 62 is used to measure the power level of the first power source 50. Thereafter, the measuring means 62 also conveys the power level information to the encoder 60. It is further preferred that the encoder 60 comprise an encoding integrated circuit (IC). The most preferred encoder 60 is a Holtek Encoder HT-12E that is commercially available. The measuring means 62 is preferably one half of an operational amplifier (OpAmp) circuit 64, a plurality of resistors 59 and a voltage reference 65. The most preferred OpAmp circuit 64 comprises a model LM2903 OpAmp circuit. The preferred resistors 59 used in the measuring means 62 comprise a 10 kilo-ohm resistor 59a, a 100 kilo-ohm resistor 59c and a 7.5 kilo-ohm resistor 59b. The most preferred voltage reference 65 comprises a 2.5 volt voltage reference having model number LM285-2.5.

Still referring to the same embodiment in FIG. 3 a delaying means 66 may be used to delay the encoder 60 from transmitting the data until all the circuitry of the encoder 60 is powered up and stable. The delaying means 66 is preferably the other half of the OpAmp circuit 64 described above used in conjunction with a plurality of resistors 69 and a capacitor 61. The most preferred OpAmp circuit 64 comprises the model LM 2903 OpAmp circuit identified above. The plurality of resistors 69 most preferably comprises two 10 kilo-ohm resistors 69a and one 100 kilo-ohm resistor 69c. It is also preferred that the capacitor comprises a 0.1 microferad capacitor 63.

Another embodiment of the transmitting module 18 depicted in FIG. 3 is a conserving means that is used to conserve the power level of the first power source 50. Preferably, the conserving means comprises an activating means 70 that only activates the first power source 50 of the transmitting module 18 at periodic intervals. The most preferred activating means 70 comprises a slow timing circuit 72 that is shown in more detail in FIGS. 4 and 5 and is discussed infra.

Still referring to FIG. 3 the transmitting means 54 preferably comprises an encoder 60, which is most preferably the same encoder 60 used for the reading means 46. The encoder 60 transmits data over an RF link 256, shown by line 20, to the base module 22. This is accomplished by using an AM transmitting unit 74 or an FM transmitting unit 76. Preferably, the AM and FM transmitting units 74 and 76 may comprise the AM-RT4-433 Unit 74 or the TXM-433-A unit 76, respectively, both manufactured by Abacom Technologies. Each bit of information transmitted by the transmitting means 54 represents one condition. For instance, information pertaining to the three different levels of the container 44—that is, ¾ full ½ full and ¼ full—and the power level of the first power source 50 comprise four conditions which represents 4-bits of information.

Next, the receiving means 78 of the base module 22 receives the transmission from the transmitting means 54. In particular, the receiving means 78 comprises a receiver 80 and a decoder 82. In operation, the receiver 80 receives the data sent from the transmitting means 54 and conveys the data to the decoder 82. The receiving means 78 is preferably an RF receiving unit so that it can receive transmissions over the RF link 256, shown by line 20. The preferred receiver 80 comprises either an AM receiver 80a or an FM receiver 80b, most preferably either the AM-HRR3-433 receiver or the SILRX-433-A receiver, respectively, both manufactured by Abacom Technologies. The decoder 82 is preferably a Holtek decoder 82, most preferably the HT-12D unit.

Dip switches may be used in both the transmitting module 18 and the base module 22 to change the addresses, respectively, of the encoder 60 and the decoder 82. This allows for multiple pairings of transmitting modules 18 and base modules 22 at the same remote location 12, shown in FIG. 1, which results in the detection of a number of containers 44 at the same location 12. The binary address of a transmitting module 18 is matched with the binary address of a base module 22 so that the two modules 18 and 22 may communicate with each other. The most preferred dip switches are four-position dip switches 178 because they allow for sixteen different addresses to exist at a single location 12. Preferred four-position dip switches 178 are C&K-BD04 dip switches. It is further preferred that the transmitting module 18 and the base module 22 not be farther than 300 feet apart.

The decoder 82, then, conveys the received data to the first processing means. Preferably, the first processing means comprises a first microprocessor 86. The most preferred first microprocessor 86 is the Atmel AT89S8252 microprocessor 86. A rapid timing circuit 346 is used in conjunction with the first microprocessor 86 to constantly activate the first microprocessor 86. The rapid timing circuit 346 preferably comprises a rapid oscillator 206a and two capacitors 84. The preferred rapid oscillator 206a comprises a crystal oscillator, most preferably an 11.0592 mega-hertz xtal oscillator. The preferred capacitors 84 comprise 33 picofarad ceramic capacitors.

It is further preferred that the base module 22 has six switch inputs 88 (discussed infra) and transferring means 90, whereby the six switch inputs 88a–88f convey high/opened and low/closed switch information to the transferring means 90 which, then, conveys that information to the first microprocessor 86. As discussed supra, three 88a–88c of the six inputs 88a–88f may match-up with the level of the contents in a container, while the other three inputs 88d–88f may match up with other conditions, such as the level of contents in other containers. If a switch input 88 is in the high/opened state, then the first microprocessor 86 will not match the condition with a telephone number. But, if a switch input 88 is in the low/closed state, then this is considered an "active" state and the first microprocessor 86 matches the appropriate telephone number with the condition to prepare for that number to be dialed (shown in FIG. 6B). The transferring means 90 protects or buffers the external surroundings from the inputs 88 to the first microprocessor 86 to prevent interference therefrom. The preferred transferring means 90 is an inverter, the most preferred inverter being a trigger inverter. The most preferred trigger inverter is a Schmidt trigger inverter IC U6 having model number 74HC14.

The base module 22 is powered by a second power source 98. The second power source 98 is preferably a transformer, most preferably a wall transformer 102 having a 12 volt DC output, such as the 12 volt-500ma DC-CUI STACK#DPD120050-P-5 wall transformer. The wall transformer 102 feeds power, sequentially, to a power input jack 104, a full wave bridge circuit 106 and a regulator 108. The regulator 108, then, feeds power to the rest of the internal circuitry of the base module 22. The full wave bridge circuit 106 allows any polarity of DC input to power the base module 22 and is, most preferably, a full wave bridge circuit 106 made up of four 1N4004 diodes 107. The regulator 108 is most preferably a 5-volt regulator 108, such as the 7805-voltage regulator unit, that converts the incoming 12 volts DC from the wall transformer 100 to a lower power level of 5 volts.

As a precaution against losing the operating program (disclosed in the MICROFICHE APPENDIX attached hereto and discussed infra) that is running the first microprocessor 86, there is a watchdog IC 114 that generates a reset pulse to restart and power-up the first microprocessor 86. To prevent the watchdog IC 114 from generating the reset pulse, it is preferable to utilize a strobe input in the watchdog IC 114 that is periodically strobed or toggled by the first microprocessor 86. While the strobe input is toggled, the watchdog IC 114 will not generate a reset pulse. But, if the first microprocessor 86 stops toggling the strobe input, the watchdog IC 114 will, after a set time period, generate a reset pulse to restart the first microprocessor 86. The most preferred watchdog IC 114 is the Maxim MAXCPA1232uP supervisor unit.

Continuing the base module 22 preferably has at least one external first-indicator 120 and means for turning on the first-indicator 120. The first-indicator 120 allows human operators to supervise the conditions of the base module 22 by connecting the first indicator 120 to the first processing means of the base module 22. The means for turning on the First indicator 120 most preferably comprises at least one transistor 124, while the first-indicator 120 comprises at least one lamp. The most preferred lamp is at least one light emitting diode (LED) 174. In the most preferred embodiment the first processing means relays data to the transistors 124 which lights the light emitting diodes 174, thus alerting operators on the scene of any problems. The preferred transistors 124 comprise MPS-A18 transistors. The first-indicator 120 can be used to alert operators regarding the different conditions of the remote location 12, the transmitting module 18 or the base module 22, depending on the preference of the user. The most preferred conditions indicated comprise: the low power level of the second power source 98 of base module 22; the different levels of the containers 44; telephone dialing in progress; the low power level of the first power source 50 of the transmitting module 18; and that valid data has been received from the transmitting module 18.

At least one second indicator 194 may be used to supplement the first-indicator 120. The second indicator 194 is most preferably also an LED. The specific process encompassing this embodiment is discussed infra and illustrated in FIG. 6B. In the preferred embodiment, the first indicator 120 is a light source that can be seen from a distance to alert operators of potential problems, while the second indicator 194 is an LED 175 on the base unit 22 that can be viewed at a close range thereto. Additionally, multiple first indicators 120 and second indicators 194 may be utilized to indicate different conditions, a sample of which is illustrated in FIG. 6B and its corresponding discussion infra. The most preferred LEDs 175 used for the second indicators 194 comprise size T-1 LEDs 175. Resistors 58b may be used in series with the LEDs 175 to limit the current running through the LEDs 175. Preferred resistors comprise 470-ohm resistors 58b.

The base module may also have reporting means 128 that report conditions at a close proximity to the base module 22. FIG. 3 illustrates the reporting means 128 reporting the conditions of a container 44 located near the base module 22. The reporting means 128 operates in the same manner as the detecting means 14 described above. As such, the reporting means 128 may comprise any of the types of devices discussed for the detecting means 14. But, the most preferred reporting means 128 are switch inputs 88. However, alternatively, ultrasonic ranging units 130 shown schematically in FIG. 3 can be used. Either way, the reporting means 128 utilizes wiring 47 to send data from the container 44 to the first processing means 84 of the base module 22. The preferred wiring 47 is hard wire inputs. If an ultrasonic ranging unit 130 is used as the reporting means 128, it would use the first microprocessor's 86 internal timing functions to measure the time it takes for an ultrasonic pulse to travel from the top of a container 44 to the contents 45 therein and, then, back to the top to compute the level of the contents 45 in the container 44. The most preferred ultrasonic ranging units 130 comprise units made by Polaroid. However, if the switch inputs 88 are used, they would be used in the same manner as described above for the detecting means that is, with a float placed on top of the contents 45 within the container 44. Most preferably, each of the switch inputs 88a–88f are connected to connectors to facilitate external connections to the reporting means 128. The preferred connectors comprise dual row 12-pin right angle "Molex Microfit" connectors.

The conveying means 134 of the base module 22 conveys the data processed by the first processing means 84 to the identifying means 26, as shown by dotted line 24. It accomplishes this by calling the telephone number determined by the first processing means 84 which matches each condition with an appropriate telephone number, as selected from a list of pre-programmed telephone numbers, identified in FIG. 3 as a pre-programmed telephone number database 136. The database 136 is ideally stored in non-volatile memory 138 inside the first microprocessor 86. The selection of the appropriate telephone number by the first processing means 84 is accomplished by the novel software program attached to this patent application, as disclosed in the MICROFICHE APPENDIX. The MICROFICHE APPENDIX and FIGS. 6A–6B also disclose the process by which the appropriate telephone number is selected.

Still referring to the conveying means 134, it preferably comprises a microprocessor, most preferably the first microprocessor 86 used for the first processing means 84. The microprocessor is connected to a modem 142 and an operating program. Modems 142 are commercially available, but the preferred modem 142 is a Cermetec modem having part number 1786LC.

Figure 7:
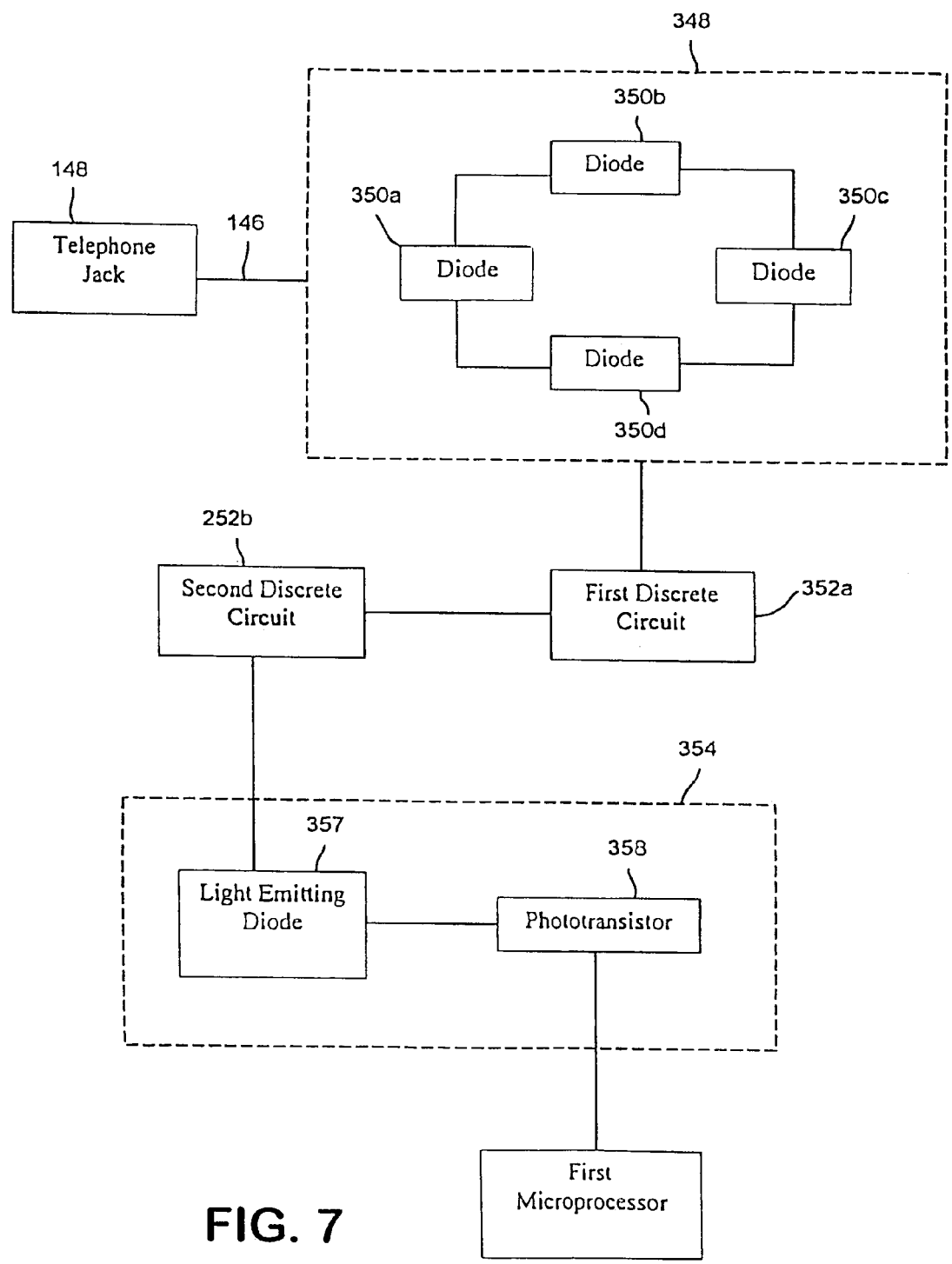
FIG. 7 is a block diagram illustrating one embodiment of the off-hook detecting means used in the base module.

Another component of the conveying means 134 is telephone lines 146 (shown in FIG. 7) used to convey the data. When telephone lines 146 are used, one of skill in the art will know to use telephone jacks 148 (shown in FIG. 7) in the base module 22 for connecting the telephone lines 146 to the base module 22. The most preferred telephone jacks 148 comprise Corcom RJ11-2L-S telephone jacks 148. It is to be understood that cellular telephones may be used as a substitute component for telephone lines 146, in which case modems 142 adapted for use with cellular telephones are required, along with other devices known in the art for utilizing cellular telephones. Thus, line 24 depicts data transmissions by either telephone lines 146 or cellular telephones. FIG. 7 illustrates an off-hook detecting means 348 that detects whether the telephone line 146 is in use (off-hook) or not in use (on-hook) and is described in detail infra.

Updating means may be used to update the information stored in both the pre-programmed telephone number database 136 and the operating program of the microprocessor. The most preferred updating means is a connector. The preferred connector comprises the 9-pin female D-subminiature right-angle board mount "Amp 745781-4" connector.

Often, electrical noise on telephone lines 146 can damage the circuitry as it travels between the modem 142 and the telephone lines 146. Protecting means are preferably used to protect the circuitry. Preferable protecting means include additional circuitry in the form of high voltage capacitors 162, ferrite beads 164, resettable fuses 166 and surge protectors 168. The most preferred ferrite beads 164 comprise the "Fair-Rite" 264366611 ferrite bead 164a or the "Fair-Rite" 2943666661 164b ferrite bead. The most preferred resetable fuses 166 comprise Raychem Polyswitch TR600-150 fuses, while the most preferred surge protectors 168 comprise Teccor Sidactor P3203AB surge protectors. When cellular telephones are used as the conveying means 134, electrical noise is not a problem, such that protecting means are not required.

Referring to FIG. 3, the identifying means 26 receives the data sent by the conveying means 134 of the base module 22. Specifically, a second processing means 180 having a CALLER ID unit 182 is the preferred identifying means 26. If the second processing means 180 is not used, a CALLER ID unit 182 may be used by itself as the identifying means 26. Either way, the CALLER ID unit 182 is the component that initially receives the data sent by the conveying means 134. Preferable CALLER ID units 182 comprise the "WhozzCalling?Lite4"™ and "Whozz Calling?Lite8"™ units made by Zeus Phonstuff, Inc., Norcross, Ga., that is commercially available. Furthermore, a printer 184 may be connected to the second processing means 180 so that the data identified by the identifying means 26 may be printed as a written record. The most preferred second processing means 180 is a second microprocessor. It is also preferred that the second microprocessor utilizes a hard drive or a floppy drive (not shown), or most preferably both, to store data comprising information regarding the location 12 of the incoming call.

Once the identifying means 26 identifies the remote location 12 of the originating call to the pre-programmed telephone number, and before the receiving means answers the call, a disconnecting means 186 may be used to disconnect the call, whereby the information is passed before a call is completed. This results in substantial savings for the user. The disconnecting means 186 is most preferably located in the base module 22 and connected to the conveying means 132. The typical disconnecting means 186 comprises a modem 142, preferably the same modem 142 used to call the identifying means 26 described above. Further, the disconnecting means 186 optimally allows the telephone call to ring for a time period equivalent to four rings before disconnecting the call, so that the identifying means 180 may identify the remote location 12 of the call. The number of telephone rings may vary depending on one's preference.

Since the conveying means 132 calls different pre-programmed telephone numbers for different conditions, one can determine from observing the identifying means 26 which condition corresponds with which remote location 12. As a result, one can send, shown by line 200, either emptying means 196 or recharging/changing means 198, or both, to the appropriate remote location 12 or to a location at a close proximity to the base module 22 to remedy the problem. It is most preferable that the second processing means 180 comprise software to make the decision shown by line 200. This software could also be programmed to print out a report detailing the conditions from the transmitting module 18 and/or the base module 22. Software that is compatible with the second processing means 180 comprises the "Callwhere (R) Plus for Windows" program made by A&A TeleData, Austin, Tex., that is commercially available.

Emptying means 196 may involve using a human operator (not shown) to physically empty the container 44 or it may involve contacting a commercial service (not shown) to empty the container 44. Recharging means 198 include either recharging or changing the first 50 or second 98 power source.

Figure 4:
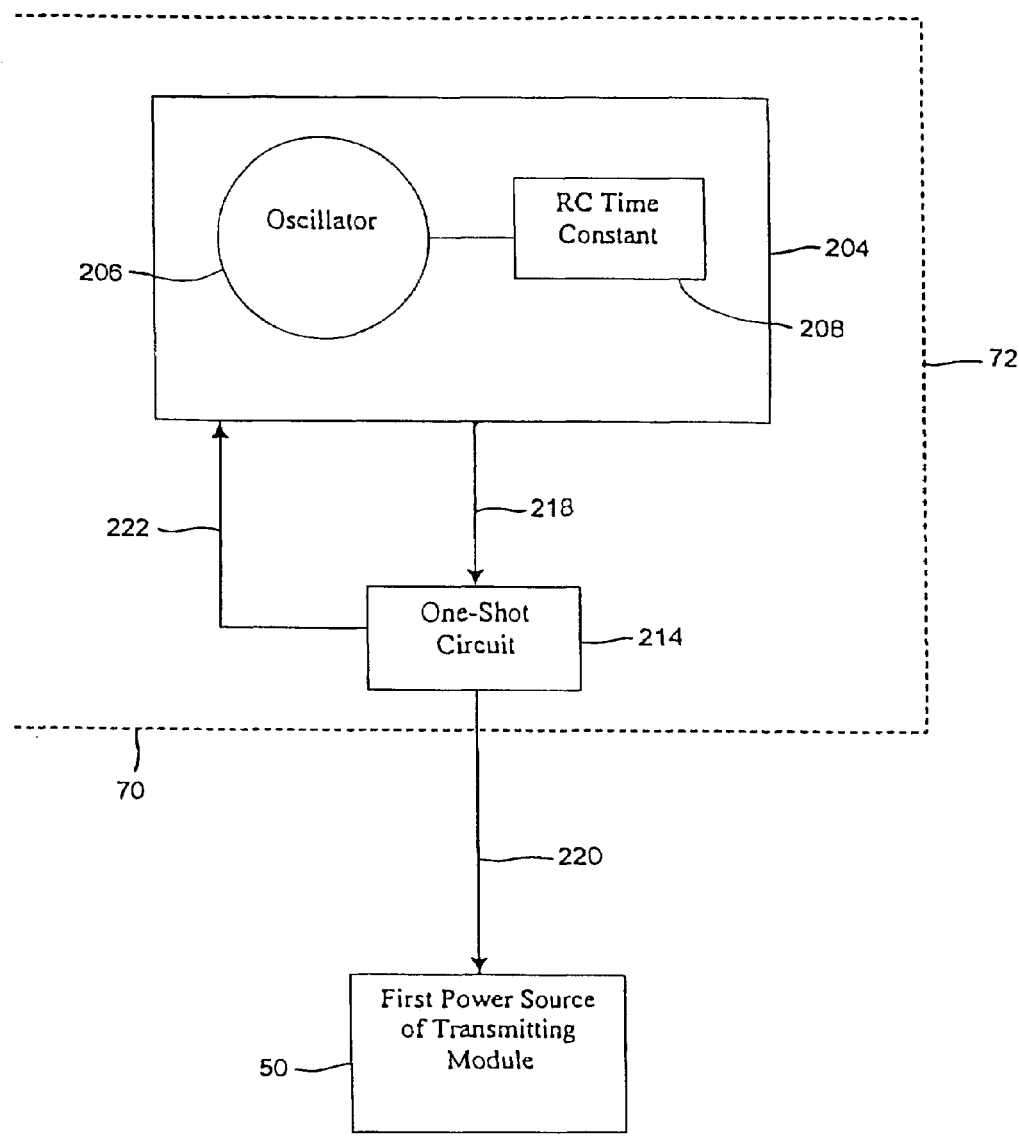
FIG. 4 is a block diagram illustrating one embodiment of the conserving means used in the transmitting module.

Referring now to FIG. 4, the conserving means 68 of the transmitting module 18 is shown in a block diagram. The specific embodiment displayed is a slow timing circuit 72 (indicated by a dotted rectangular area) that only activates the transmitting module 18 at periodic intervals. The slow timing circuit 72 comprises a counter 204 having an oscillator 206 and an RC time constant 208. The oscillator 206 preferably comprises a slow oscillator. The RC time constant controls the frequency of the slow oscillator 206, as shown by line 212. The counter 204 triggers a one-shot circuit 214 within the slow timing circuit 72 when a pre-selected count is reached, shown by line 218. The one-shot circuit 214 is only activated for 10 seconds so as to conserve energy. Thereafter, the one-shot circuit 214 turns on the first power source 50 of the transmitting module 18, depicted by line 220. The activated one-shot circuit 214 also resets the counter 204 back to its starting count, illustrated by line 222. The most preferred counter 204 is a CD4060BCN counter, while the most preferred one-shot circuit 214 is a CD4538BCN one-shot circuit.

Figure 5:
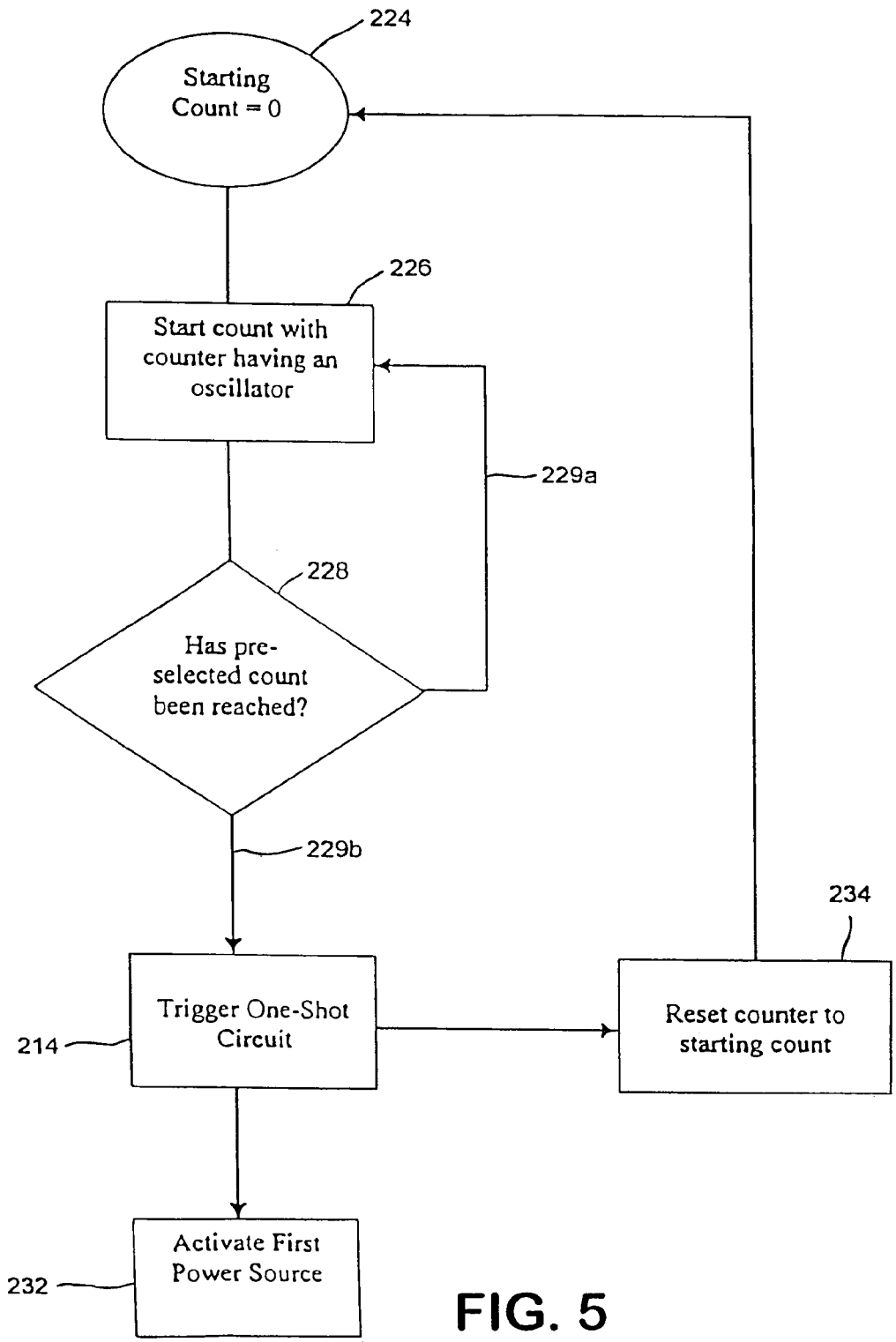
FIG. 5 is a flow diagram showing the process of conserving the power level of the first power source in the transmitting module.

FIG. 5 shows a flow diagram of the process of conserving the power level of the first power source 50. A starting count 224 is initially set at zero. Then, step 226 shows that the counter 204 starts the count. Step 228 decides whether the pre-selected count has been reached. The most preferred pre-selected count set to five hours, but one of skill in the art will know that the pre-selected count is variable depending on one's preferences and needs. If the pre-selected count has not been reached, then the count continues, as shown by line 229a. But, if the pre-selected count is reached, line 229b shows that the next step 230 is to trigger the one-shot circuit 214 for 10 seconds. Once the one-shot circuit 214 is triggered, step 232 activates the first power source 50 of the transmitting module 18 and step 234 resets the counter 204 back to the starting count to start the process again, all within the 10 seconds of activation. In the manner described above, the power level of the first power source 50 is not continually used; rather, the first power source 50 is only activated at periodic intervals for merely 10 seconds to run the transmitting module 18. The transmitting module 18 uses the most power when it is transmitting data during this short time period. Otherwise, the conserving means causes the transmitting module 18 to "sleep" and not consume the power of the first power source 50. This results in large monetary savings for the user and is also environmentally friendly.

Figure 6A:
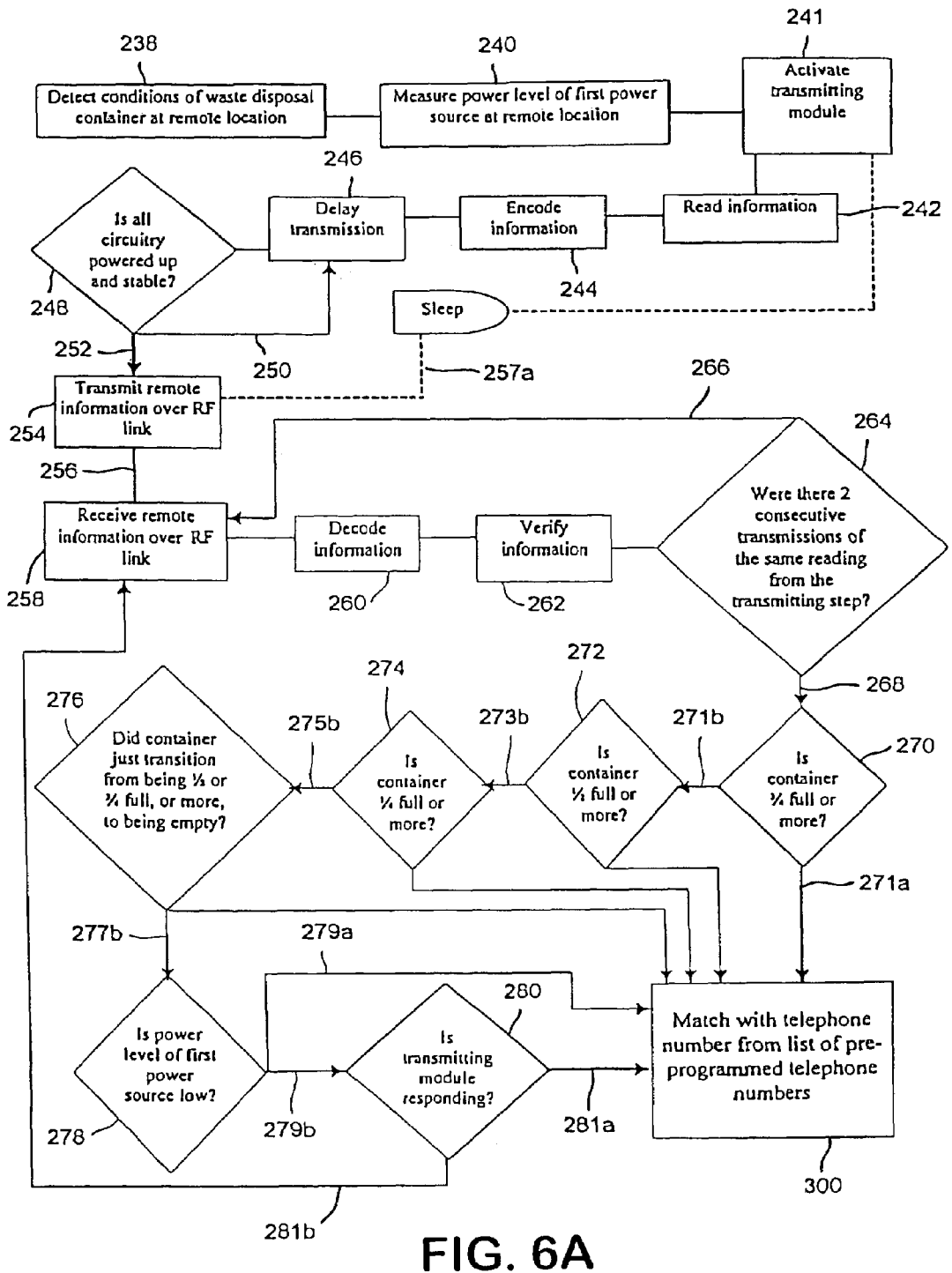
FIG. 6A is a flow diagram of one embodiment of the method of monitoring conditions of a waste disposal container at a remote location and matching the conditions to a telephone number.
Figure 6B:
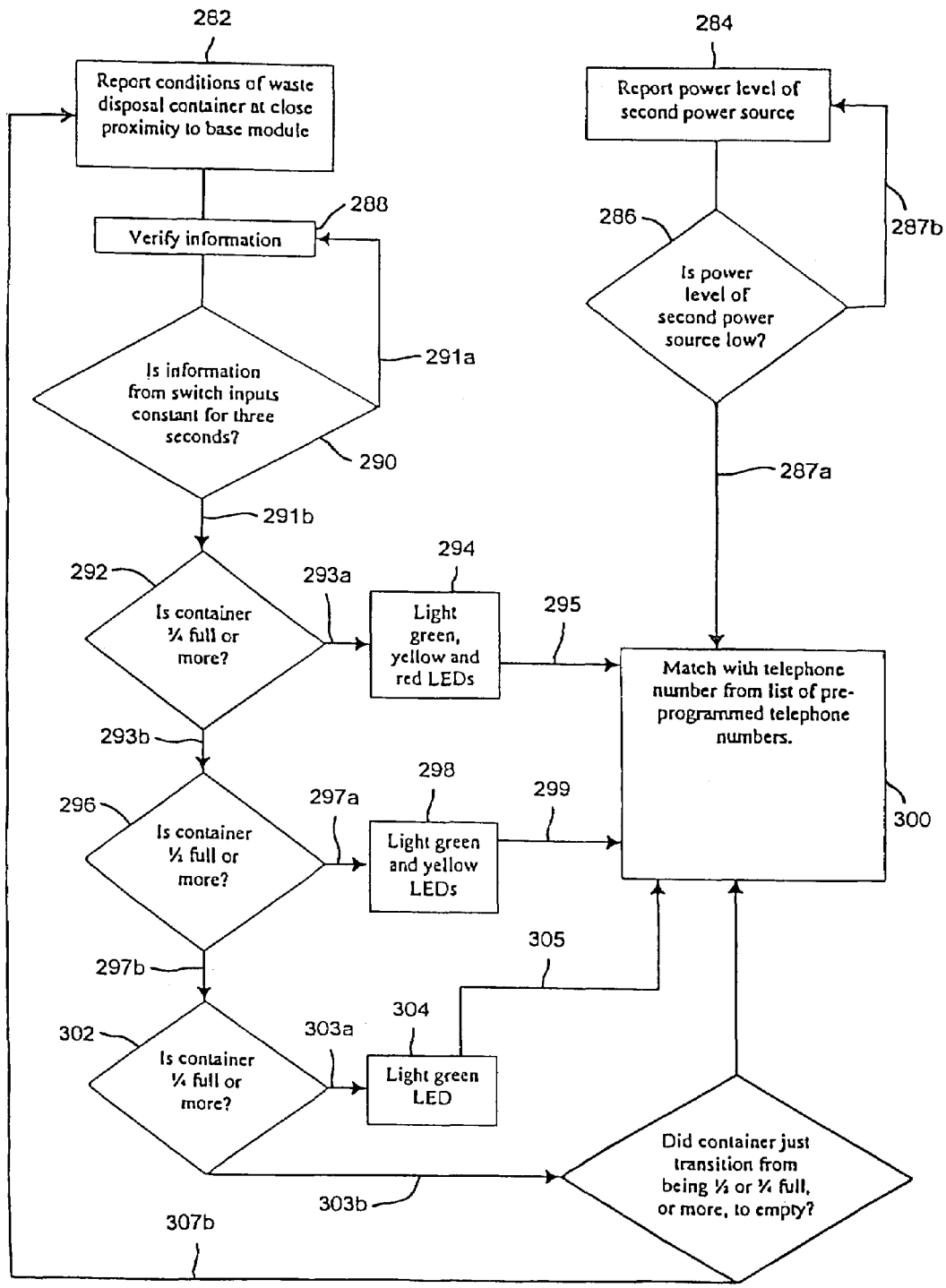
FIG. 6B is a flow diagram of one embodiment of the method of monitoring conditions of a waste disposal container located at a close proximity to the base module and matching the conditions to a telephone number.
Figure 6C:
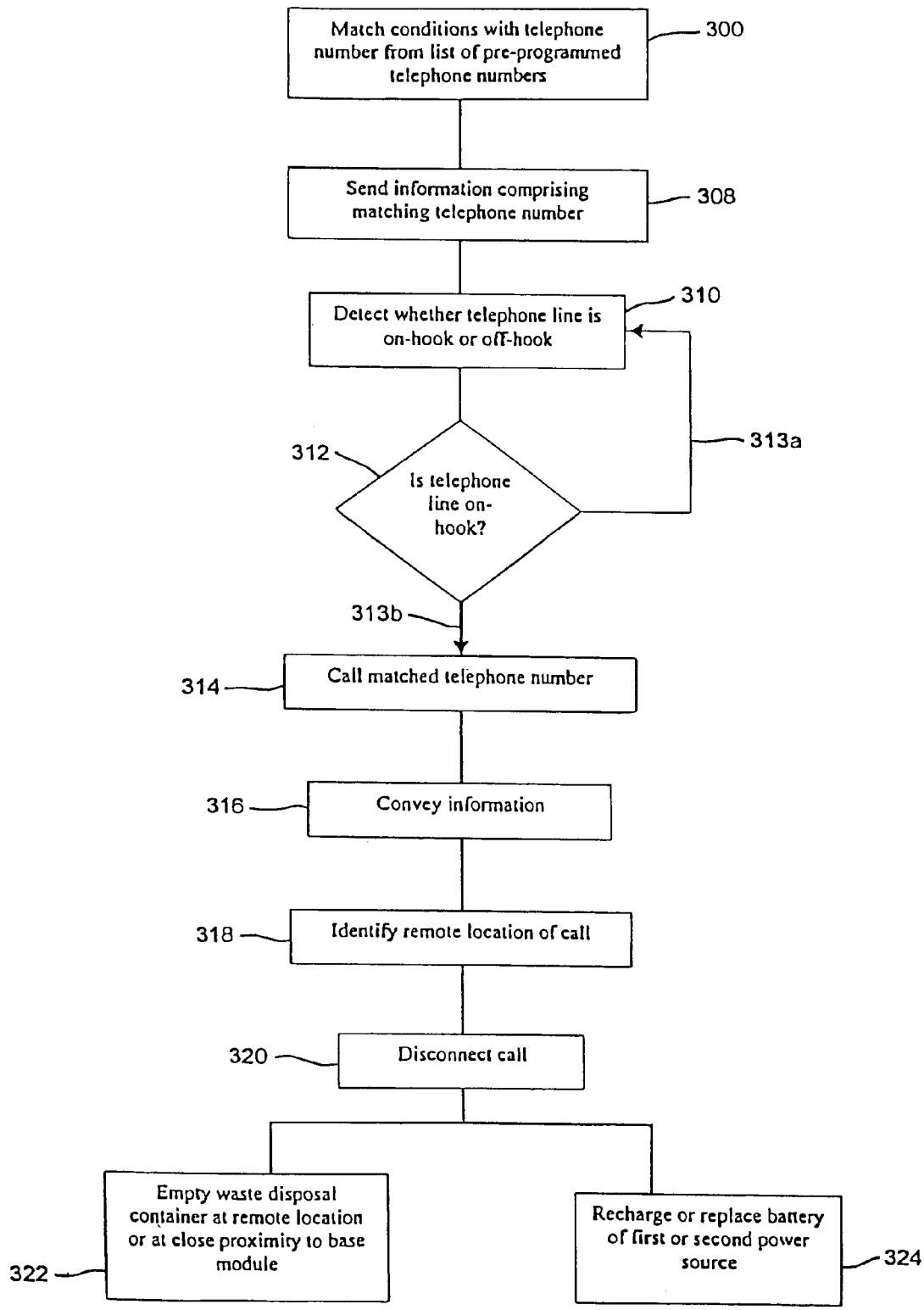
FIG. 6C is a flow diagram of one embodiment of the method of calling the telephone number matched in FIGS. 6A & 6B and conveying information regarding the monitored conditions.

FIG. 6 is split into three flow diagrams which, in totality, illustrate one preferred embodiment of the instant invention in which: FIG. 6A illustrates the process of monitoring the conditions of a waste disposal container at a remote location 12; FIG. 6B shows the process of monitoring the conditions of a waste disposal container at a close proximity to the base module 22; and FIG. 6C illustrates the process of conveying the conditions monitored by FIGS. 6A and 6B so that appropriate steps are taken to remedy the conditions. Both FIG. 6A and FIG. 6B emphasize the steps of matching the monitored conditions with one of the telephone numbers selected from the list of pre-programmed telephone numbers in database 136.

Referring firstly to FIG. 6A, step 238 detects the conditions of the waste disposal container at the remote location 12. Step 240 measures the power level of the first power source 50. Step 241 activates the transmitting module 18 using the conserving means. Step 242 reads the information obtained during steps 238 and 240. Next, the information is encoded by step 244. Transmission of the information is delayed by step 246 until all circuitry is powered up and stable. Step 248 decides whether all of the circuitry is powered up and stable. If not, line 250 shows that the transmission must be delayed by step 246 until the answer to step 248 is in the affirmative. But, if the answer to step 248 is yes, then line 252 indicates that the information is transmitted by step 254, which shows the process of transmitting the information over the preferred RF link 256. After the information is transmitted by step 254, dotted-line 257a shows that the transmitting module 18 goes to sleep as step 257. Dotted-line 257b illustrates that the transmitting module 18 sleeps until it is activated again by step 241.

The transmitted information is received by step 258 and decoded by step 260. Step 262 shows that the information must be firstly verified, because an initial transmission by the transmitting step 254 may contain a false reading of the level of the contents 45 in the waste disposal container. To prevent the processing of false readings, a second transmission received by the receiving step 258 must contain the same information as the initial transmission for the information to be considered valid. The initial and second transmission—called consecutive transmissions—must necessarily occur at five-hour intervals in the preferred embodiment, because the transmitting module 18 is only activated by the activating step 241 every five hours. For example, if, during the initial transmission, the contents 45 in the waste disposal container 236 did not settle, any readings of such information would be inaccurate. Thus, during the second transmission, if the contents 45 have settled, then a different reading would be taken, and the information received from consecutive transmissions of step 254 would not be the same and, hence, would not be firstly verified by step 262. Consequently, only two consecutive transmissions having the same readings would comprise valid information.

Additionally, to further ensure that the information transmitted by step 254 is valid, receiving step 258 disables the base unit 22 for twenty seconds after it receives information from the transmitting module 18. As a result, no information, whether containing false readings or not, may be received by step 258 during this twenty-second period.

Continuing with FIG. 6A, step 264 decides whether the transmitting step 254 sent two consecutive transmissions. If not, then line 266 shows that the receiving step 258 is revisited to determine whether more transmissions are forthcoming from step 254. If the transmitting step 254 does send two consecutive transmissions, at five-hour intervals, then line 268 leads to a series of steps which match a condition at the remote location 12 with a telephone number from the list of pre-programmed telephone numbers in database 136.

Step 270 decides whether the remote waste disposal container is ¾ full or more. If so, then line 271a leads to step 300 which matches ("matching step") that condition with a telephone number. It is important to note that the matching steps 300 disclosed in FIGS. 6A–6C are all typically conducted by the novel software program disclosed in the MICROFICHE APPENDIX attached hereto. If the answer to step 270 is in the negative, line 271b leads to step 272 to determine whether the remote waste disposal container is ½ full or more. If so, then line 273a leads to the matching step 300 to match that condition with a telephone number. If the answer to step 272 is in the negative, then line 273b leads to step 274 to decide whether the remote container is ¼ full or more. If so, then line 275a leads to the matching step 300. If not, then line 275b leads to step 276.

Step 276 determines whether the remote trash container just made a transition from being either ½ or ¾ full, or more, to being empty. If so, line 277a leads to the matching step 300. If not, line 277b leads to step 278, which determines whether the power level of the first power source 50 is low. If the power level is low, line 279a leads to the matching step 300. But if the power level is not low, line 279b leads to step 280 to determine whether the transmitting module 18 is responding properly. If the transmitting module 18 is not responding properly, line 281a leads to the matching step 300. However, if the transmitting module 18 is responding properly, then line 281b indicates that receiving step 258 is revisited to prepare to receive another transmission from the transmitting module 18. Incidentally, the order of steps 270–280 is not of paramount importance. One skilled in the art will know that these steps may be arranged in any order to suit one's preference.

Monitoring the transition of the remote trash container from being ½ or ¾ full, or more, to being empty via step 276 is important because experience shows that some remote trash containers 44, may have their contents 45 stolen. It is favorable, then, for the activating step 241 to be "awakened" immediately in such circumstances so that this information may be transmitted by step 254. The quicker activation of step 241 may be adjusted depending on the user's preference. Thus, once this transition is detected and received by step 258, then step 300 matches the appropriate telephone number with this condition, thereby allowing the steps illustrated in FIG. 6C (discussed below) to convey this transition. The desired result is to catch potential thieves in the act, or shortly thereafter.

Referring now to FIG. 6B, step 282 reports the conditions of any waste disposal containers in close proximity to the base module 22, and step 284 reports the power level of the second power source 98. Step 286 decides whether the power level of the second power source 98 is low. If the second power source 98 is at low power, line 287a will lead to step 300 to match this condition with a telephone number from the list of pre-programmed telephone numbers in database 136. Step 300 is the same as the match step 300 disclosed in FIG. 6A, so it will also be termed the "matching step" 300. If, however, the power level of the second power source 98 is not low, then line 287b will lead to step 284 to continue reporting the power level. Steps 284–286 are preferably utilized when the second power source 98 is a battery, since batteries tend to be used up sooner than the power from a transformer 100 (disclosed above).

The information reported by step 282 must be secondly verified by step 288. Step 288 is similar to step 262 (shown in FIG. 6A and its accompanying discussion) in that the former ensures that no false readings are reported by step 282. However, since step 282 is not subject to the five-hour interval transmissions of step 254 (shown in FIG. 6A), another verifying technique must be utilized. As such, the secondly verifying step 288 is accomplished by the preferred switch inputs 88 staying in the same high/opened or low/closed state for three seconds to allow the contents 45 of the waste disposal container to stabilize or to allow for any electrical noise to be ignored before the information is considered valid. Step 290 determines whether the information reported by step 282 is constant for three seconds. If not, line 291a returns to step 288 to attempt to verify the reported information. If so, line 291b shows that the reported information is considered valid.

Still referring to FIG. 6B, step 292 determines whether the waste disposal container located at a close proximity to the base module 22 is ¾ full or more. If so, line 293a leads to step 294 to light a green 174a, yellow 174b and red 174c light emitting diode ("LED"). The LEDs 174a–174c disclosed in FIG. 6B provide operators stationed at or near the base module 22 with notice of the level of the trash container located near the base module 22. Line 295 indicates that once the LEDs 174a–174c are lit, the condition is matched with a telephone number by the matching step 300. If the answer to step 292 is in the negative, line 293b leads to step 296 to determine whether the waste disposal container is ½ full or more. If so, line 297a leads to step 298 to light the green 174a and yellow 174b LED. Then, line 299 leads to the matching step 300. But if the container is not ½ full or more, line 297b leads to step 302 to decide whether the trash container is ¼ full or more. If so, line 303a leads to step 304 to light the green LED 174a. Thereafter, line 305 leads to the matching step 300. If the answer to step 302 is in the negative, then line 303b leads to step 306 to determine whether the waste disposal container has undergone the transition from ½ or ¾ full, or more, to empty (as discussed above). If this transition is detected, line 307a leads to matching step 300. However, if the answer to the transition step 306 is in the negative, line 307b leads back to step 282 to restart the reporting process for the waste disposal container at close proximity to the base module 22. One of skill in the art will know that the color of the LEDs 174a–174c in the above-described embodiment may be varied according to one's desires and tastes. These descriptions are merely a sample of one of the preferred embodiments of the disclosed invention.

Referring to FIG. 6C, matching step 300 is shown to indicate the position where FIGS. 6A–6B leave off and where FIG. 6C begins. After telephone number is matched with the appropriate condition by step 300, step 308 sends the information comprising the matching telephone number to step 310, which detects whether the telephone line 146 is on-hook (not in use) or off-hook (in use), discussed infra and shown in more detail in a block diagram in FIG. 7. Step 312 is the decision step that determines whether the telephone line 146 is on- or off-hook. If the telephone line 146 is off-hook, the answer to step 312 is in the negative and line 313a indicates that step 310 is revisited to repeat the off-hook detection. But, if step 312 determines that the telephone line 146 is on-hook, the answer to step 312 is positive and line 313b shows that the process proceeds to step 314 to call the matched telephone number. Once the telephone number is called, step 316 conveys the information by way of having an originating telephone number that step 318 identifies. Once the originating telephone number has been identified, step 320 disconnects the call. Step 320 most preferably disconnects the call after the fourth ring, or another set time period. All that is required is that the appropriate phone number is identified, which can be done before the call is completed. Thus, the call need not be answered. Thereafter, either one of steps 322 or 324 may take place depending on whether the waste disposal container needs to be emptied (step 322) or one of the first 50 or second 98 power sources needs to be recharged or changed (step 324).

Additionally, it should be noted that after the call is disconnect by step 320, the base module 22 prepares to receive information from the transmitting module 18 (step 258 in FIG. 6A) and to report the conditions of the trash container located close to the base module 22 (step 282 in FIG. 6B) and the power level of the second power source 98 (step 284 in FIG. 6B).

When the telephone line 146 of the base module 22 is not in use (on-hook), the modem 142 of the conveying means 134 will successfully be able to call the selected telephone number. But, if the telephone line 146 is already being used, or off-hook, the modem 142 will not be able to make a call on that line 146. The problem of not knowing whether the telephone line 146 is on-hook or off-hook is solved by an off-hook detecting means 348 that is illustrated in a block diagram in FIG. 7. Referring to FIG. 7, the off-hook detecting means 348 detects when the telephone line 146 is in use and sends the off-hook information to the first microprocessor 86, which does not allow the modem 142 to call the selected telephone number. Likewise, the off-hook detecting means 348 also detects when the telephone line 146 is on-hook and, thereby, sends this information to the first microprocessor 86 to allow the modem 142 to make the call.

The preferred off-hook detecting means 348 comprises a plurality of diodes 350 connected to the telephone lines 146 leading, at one end, to a telephone jack 148 and, at another end, to a plurality of discrete circuits 352. The discrete circuits 352 lead to an opto-isolator IC (opto-coupler IC) 354 that provides the first microprocessor 86 with the on-hook and off-hook information. In a preferred embodiment of the off-hook detecting means 348 as shown in FIG. 7, the preferred diodes 350 comprise four diodes 350a–350d in a full wave bridge configuration. The diodes 350a–350d generate positive (+) and negative (−) voltage changes, whereby a positive voltage change represents that the telephone line 146 is on-hook and a negative voltage change represents that the telephone line 146 is off-hook. The preferred discrete circuits 352 comprise a first discrete circuit 352a and a second discrete circuit 352b, whereby the first discrete circuit 352a detects the positive or negative voltage change from the diodes 350a–350d and relays that information to the second discrete circuit 352b. The second discrete circuit 352b, then, becomes activated and further relays the on-hook/off-hook information to the opto-isolator IC 354. The opto-isolator IC 354 preferably comprises an LED 357 and a phototransistor 358. The LED 357 is lit when the telephone line 146 is off-hook and dim when on-hook. Once the information passes through the LED 357, it is sent to the phototransistor 358 that is light-activated and relays the information from the LED 174 to the first microprocessor 86. The first microprocessor 86 will, therefore, be informed as to whether the telephone line 146 is on- or off-hook.

This invention has great utility in the waste disposal industry, but it may also be useful in other industries where remote containers or locations need to be monitored. Hence, while the invention has been described in connection with a preferred embodiment, it will be understood that it is not intended that the invention be limited to that embodiment. On the contrary, it is intended to cover all alternatives, modifications and equivalents as may be included within the spirit and scope of the invention as disclosed.

As to the manner of usage and operation of the instant invention, same should be apparent from the above disclosure, and accordingly no further discussion relevant to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered illustrative of only the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of monitoring conditions at a remote location, comprising the steps of:
   (a) detecting the conditions at the remote location;
   (b) reading the conditions at the remote location;
   (c) transmitting information regarding the conditions at the remote location;
   (d) receiving the transmitting information;
   (e) selectively processing the transmitted information to determine which of a list of pre-programmed telephone numbers to call;
   (f) calling the pre-programmed telephone number;
   (g) conveying the information; and
   (h) identifying the remote location of the call,
   wherein the selectively processing step comprises the steps of:
     (a) firstly verifying the information received by the receiving step;
     (b) secondly verifying the information received by the reporting step;
     (c) matching a condition with a telephone number from the list of pre-programmed telephone numbers, the condition being verified by the firstly verifying step and the secondly verifying step; and
     (d) sending the information regarding the condition to the calling step, and
   wherein the firstly verifying step comprises the step of waiting for two consecutive transmissions of the same information from the transmitting step, the waiting step ensuring that the transmissions comprise valid information.

2. The method of claim 1 wherein the conditions at the remote location comprise conditions of a container at the remote location.

3. The method of claim 2, wherein the container comprises a waste disposal container, the waste disposal container being filled with waste material therein.

4. The method of claim 3, further comprising the step of emptying the waste disposal container, the emptying step being activated by the identifying step.

5. The method of claim 4, wherein the emptying step is accomplished by at least one person emptying the waste disposal container.

6. The method of claim 4, wherein the emptying step is accomplished by routing at least one vehicle to the remote location to empty the waste disposal container.

7. The method of claim 1, wherein the detecting step comprises using remote sensors.

8. The method of claim 1, wherein the reading step and the transmitting step occur in a transmitting module.

9. The method of claim 8, further comprising the step of providing a first power source to the transmitting module, the first power source having a power level.

10. The method of claim 9, further comprising the step of measuring the power level of the first power source.

11. The method of claim 10, further comprising the step of conserving the power level of the first power source.

12. The method of claim 10, wherein the reading step further comprises the step of reading the power level of the first power source.

13. The method of claim 12, further comprising the step of encoding the information containing the conditions of the remote location and the power level of the first power source.

14. The method of claim 13, further comprising the step of delaying the transmitting step, the delaying step allowing all circuitry of the transmitting module to be powered up and stable.

15. The method of claim 14, wherein the transmitting step occurs over an RF link.

16. The method of claim 1, wherein the receiving step, the selectively processing step, the calling step and the conveying step all occur in a base module.

17. The method of claim 16, wherein the receiving step further comprises the step of decoding the information received from the transmitting step.

18. The method of claim 16, further comprising the step of providing a second power source to the base module, the second power source comprising a power level.

19. The method of claim 18, further comprising the step of reporting conditions at a close proximity to the base module.

20. The method of claim 18, wherein the conditions at the close proximity to the base module comprise conditions of a container at the close proximity to the base module.

21. The method of claim 18, wherein the conditions at the close proximity to the base module comprise the power level of the second power source.

22. The method of claim 1, wherein the secondly verifying step comprises the step of maintaining the reported information at high or low state for at least three seconds, the maintaining step ensuring that the information from the reporting step is valid.

23. The method of claim 1, wherein the matching step comprises the steps of:
 (a) firstly matching the condition obtained from the receiving step and the reporting step with one of a plurality of switch inputs; and
 (b) secondly matching the condition with the telephone number from the list of pre-programmed telephone numbers.

24. The method of claim 23, wherein the firstly matching step comprises the step of matching one of the switch inputs with the condition as follows:
 (a) matching switch input 1 with the condition that the container is ¼ full;
 (b) matching switch input 2 with the condition that the container is ½ full; and
 (c) matching switch input 3 with the condition that the container is ¾ full.

25. The method of claim 23, further comprising the step of indicating each condition matched by the matching step, the indicating step allowing human operators to supervise the matched conditions.

26. The method of claim 25, wherein the indicating step comprises the steps of:
 (a) firstly indicating at a distance from the base module each condition matched by the matching step, the firstly indicating step allowing human operators to supervise the matched conditions at a distance from the base module; and
 (b) secondly indicating at a close proximity to the base module each condition matched by the matching step, the secondly indicating step allowing human operators to supervise the matched conditions at a close proximity to the base module.

27. The method of claim 1, further comprising the step of detecting whether a telephone line used by the calling step is off-hook.

28. The method of claim 27, wherein the off-hook detecting step comprises the steps of:
 (a) generating one of a positive and negative voltage change using a plurality of diodes, whereby a positive voltage change represents that the telephone line is on-hook and a negative voltage change represents that the telephone line is off-hook;
 (b) Detecting the voltage change with a plurality of discrete circuits;
 (c) indicating the voltage change with a light emitting diode, whereby a lit light emitting diode indicates a negative voltage change and a dim light emitting diode indicates a positive voltage change; and
 (d) relaying the voltage change to the first processing step.

* * * * *